(12) United States Patent
Mochizuki et al.

(10) Patent No.: US 7,905,803 B2
(45) Date of Patent: Mar. 15, 2011

(54) STRADDLE-TYPE VEHICLE AND POWER UNIT

(75) Inventors: Shigehiro Mochizuki, Shizuoka (JP); Kazuhiko Izumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 941 days.

(21) Appl. No.: 11/466,811

(22) Filed: Aug. 24, 2006

(65) Prior Publication Data

US 2007/0054764 A1 Mar. 8, 2007

(30) Foreign Application Priority Data

Sep. 5, 2005 (JP) ................. 2005-256702

(51) Int. Cl.
*F16H 9/12* (2006.01)
*F16H 59/00* (2006.01)
*F16H 61/00* (2006.01)

(52) U.S. Cl. ............... 474/18; 474/12; 474/17; 474/19; 474/23; 474/26; 475/28; 475/69; 475/210; 74/333; 74/371; 180/220; 180/233; 180/357

(58) Field of Classification Search ................ 474/28, 474/17–19, 144, 146; 477/44–46, 120
See application file for complete search history.

(56) References Cited

U.S. PATENT DOCUMENTS

| | | | |
|---|---|---|---|
| 5,025,686 A * | 6/1991 | Sato et al. .................. | 477/44 |
| 5,057,061 A * | 10/1991 | Sakakibara et al. ......... | 475/210 |
| 6,694,836 B2 * | 2/2004 | Kawamoto et al. .......... | 74/371 |
| 6,884,191 B2 * | 4/2005 | Temma et al. ............... | 474/109 |
| 7,237,638 B2 * | 7/2007 | Ishikawa et al. ............ | 180/219 |
| 7,281,603 B2 * | 10/2007 | Fukuda ....................... | 180/357 |
| 2004/0094343 A1 | 5/2004 | Fukuda | |
| 2004/0102267 A1 * | 5/2004 | Murakami et al. ........... | 474/69 |
| 2005/0109554 A1 * | 5/2005 | Ishikawa et al. ............ | 180/312 |

FOREIGN PATENT DOCUMENTS

| | | |
|---|---|---|
| JP | 3043061 B | 3/2000 |
| JP | 2002-235834 A | 8/2002 |
| JP | 2004-156657 A | 6/2004 |

OTHER PUBLICATIONS

Official Communication issued in corresponding European Patent Application No. 06018580.8, completed on Jul. 27, 2010.

* cited by examiner

*Primary Examiner* — Robert A Siconolfi
*Assistant Examiner* — San Aung
(74) *Attorney, Agent, or Firm* — Keating & Bennett LLP

(57) ABSTRACT

In a V-belt continuously variable transmission (CVT) of an ATV, a movable sheave half of a primary sheave is disposed on the outer side in the vehicle width direction with respect to a fixed sheave half, and a sheave drive mechanism for controlling the respective groove widths of the primary sheave and a secondary sheave through a driving force by an electric motor is located on the outer side in the vehicle width direction with respect to the movable sheave half of the primary sheave. A footboard of the ATV is located on the outer side of the V-belt CVT in the vehicle width direction and below a primary sheave shaft and a secondary sheave shaft. A portion of the electric motor is located above and in front of the primary sheave shaft as viewed in the sheave shaft direction. A straddle-type vehicle having the compact, yet durable V-belt continuously variable transmission achieves a speed change operation highly responsive to the vehicle running condition.

14 Claims, 13 Drawing Sheets

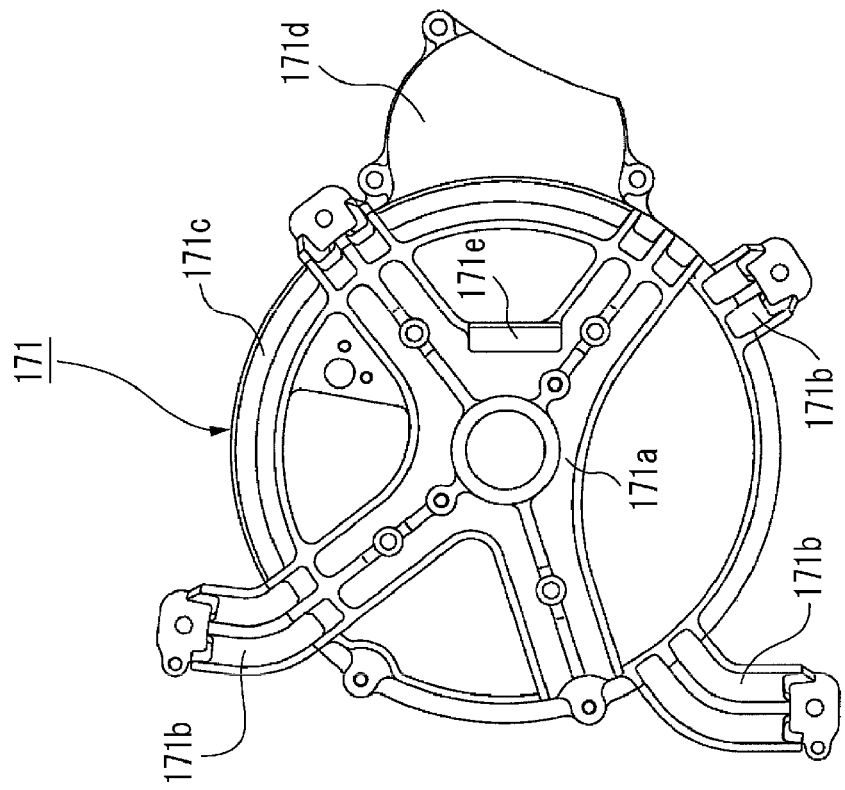
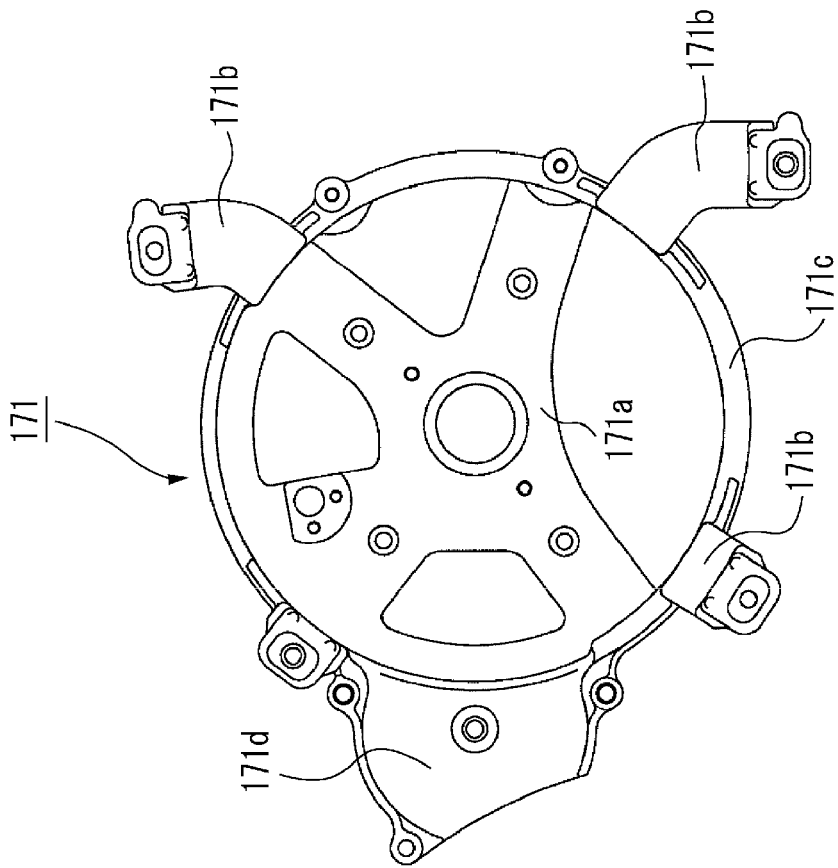
FIG. 8B
FIG. 8A

STRADDLE-TYPE VEHICLE AND POWER UNIT

BACKGROUND OF THE INVENTION

1. Field of the Invention

The present invention relates to a straddle-type vehicle having a V-belt continuously variable transmission (CVT) disposed below a seat of the vehicle and for transmitting a driving force of an engine to a driving wheel, and relates to a power unit including an engine and a V-belt CVT attached to a side of a crankcase of the engine.

2. Description of the Related Art

Recently, there is an increasing demand for straddle-type vehicles called an "ATV" (all-terrain vehicle).

Also, there have been proposed various types of ATVs in which four wheels are provided, each wheel having a wide and low-pressure balloon tire or the like on the left and right sides of the front and rear sides of a body frame, the upper portion of the body frame is provided with steering handlebars, a fuel tank, and a straddle-type seat, arranged sequentially from the front wheel side to the rear wheel side, and further including a V-belt CVT for transmitting the driving force of an engine to driving wheels disposed below the seat (see JP-A-2004-156657, for example).

The above-described V-belt CVT includes a primary sheave disposed on a primary sheave shaft, to which a driving force of the engine is input, and having a movable sheave half and a fixed sheave half to form a V-groove for receiving a belt; a secondary sheave disposed on a secondary sheave shaft, from which a driving force for the driving wheels is output, and having a movable sheave half and a fixed sheave half to form a V-groove for receiving a belt; an endless V-belt received in the respective V-grooves of the primary sheave and the secondary sheave to transmit a rotational driving force between both the sheaves; and a sheave drive mechanism for displacing the movable sheave half of the primary sheave in the axial direction to control the speed change ratio through resulting variations in respective groove widths of the primary sheave and the secondary sheave.

A previous type of sheave drive mechanism, in general was the so-called centrifugal type, which utilized centrifugal force produced according to the engine speed to displace a movable sheave half in the axial direction.

However, when the road on which the vehicle is running turns from a flat road to a climbing road, for example, the sheave drive mechanism of the centrifugal type does not perform a groove width control operation (specifically, a speed change operation) responsively according to changes in the road condition, irrespective of the intention of the rider, until the engine speed has actually decreased because of the increased load from the road. That is, the sheave drive mechanism has a problem of delayed response.

In order to solve the problem of delayed response, another type of V-belt CVT for use in scooter-type motorcycles has been proposed, which includes an electric motor, a control device for controlling the electric motor, and a sheave drive mechanism for transmitting a driving force of the electric motor to the movable sheave of the primary sheave to control the respective groove widths of the primary sheave and the secondary sheave (see JP-B-3043061, for example).

In general, the scooter-type motorcycle is provided with an integral power unit including an engine and a V-belt CVT attached to a side of a crankcase of the engine. In such a scooter-type motorcycle, the power unit may be swingably suspended from a body frame to function as a swing arm for swingably supporting a rear wheel.

With the increasing demand for ATVs these days, there is a need for V-belt CVTs for use in ATVs to electrically control the respective groove widths of the primary sheave and the secondary sheave in order to improve the response in the speed change process.

However, since ATVs are significantly different in structure from scooter-type motorcycles, the installation method of an electric motor as used in V-belt CVTs of scooter-type motorcycles cannot be used in ATVs.

For example, in the V-belt CVT of the power unit also used as a swing arm in scooter-type motorcycles as disclosed in JP-B-3043061, there is a large distance between the shafts of the primary sheave and the secondary sheave and the space between the primary sheave and the secondary sheave can be used as an installation space for an electric motor for controlling the respective groove widths of the primary sheave and the secondary sheave. In contrast, in ATVs, it is difficult to dispose an electric motor between the primary sheave and the secondary sheave as disclosed in JP-B-3043061, because the limitation on the size of a belt chamber due to the arrangement in which the V-belt CVT is disposed between the front wheels and the rear wheels necessitates a compact arrangement in which the primary sheave and the secondary sheave are located close to each other, generally side by side.

In addition, in ATVs, the belt chamber is large in the vehicle width direction because of a footrest for the rider provided on the outer side of the crankcase and the V-belt CVT, and the electric motor, when carelessly arranged on the outer side of the vehicle body, would prevent the rider from putting his/her foot in place, thereby interfering with the usability of the ATV.

Further, in the case where the electric motor is installed near a heat producing portion such as a cylinder block of the engine, the service life of the electric motor and/or the measurement accuracy of the electric motor may be reduced, whereby the original performance cannot be maintained.

SUMMARY OF THE INVENTION

In order to overcome the problems described above, preferred embodiments of the present invention provide a straddle-type vehicle and a power unit achieving a speed change operation that is highly responsive to the vehicle running condition with compact, yet durable structure.

A preferred embodiment of the present invention provides a straddle-type vehicle having a V-belt CVT disposed below a seat and for transmitting a driving force of an engine to a driving wheel, the V-belt continuously variable transmission including a primary sheave disposed on a primary sheave shaft, to which the driving force of the engine is input, and having a movable sheave half and a fixed sheave half to form a V-groove for receiving a belt; a secondary sheave disposed on a secondary sheave shaft, from which a driving force for the driving wheel is output, and having a movable sheave and a fixed sheave to form a V-groove for receiving a belt; a V-belt received in the respective V-grooves of the primary sheave and the secondary sheave to transmit a rotational driving force between both the sheaves; an electric motor; a control device for controlling the electric motor; and a sheave drive mechanism for transmitting the driving force of the electric motor to the movable sheave half of the primary sheave to adjust respective groove widths of the primary sheave and the secondary sheave, wherein the movable sheave half of the primary sheave is located on an outer side in a vehicle width direction with respect to the fixed sheave half of the primary sheave, the sheave drive mechanism is located on an outer side in the vehicle width direction with respect to the movable sheave of the half primary sheave, a footrest of the straddle-type vehicle is located on an outer side of the V-belt continuously variable transmission in the vehicle width direction and below the primary sheave shaft and the secondary sheave shaft, and at least a portion of the electric motor is located above and in front of the primary sheave shaft as viewed in a sheave shaft direction.

In the straddle-type vehicle having the above-described unique structure, it is preferred that an exhaust pipe of the engine is disposed above the V-belt CVT, and the electric motor is located in front of the V-belt CVT.

In addition, it is preferred that a front fender is disposed in front of the V-belt CVT.

In addition, it is preferred that the primary sheave and the electric motor overlap with each other as viewed in the sheave shaft direction.

In addition, it is preferred that a rotary shaft of the electric motor is coincident in direction with the primary sheave shaft.

In addition, it is preferred that the electric motor is located closer to the primary sheave shaft than a speed reduction mechanism of the sheave drive mechanism is, as viewed in the sheave shaft direction.

In addition, in the straddle-type vehicle with the above structure, it is preferred that the sheave drive mechanism is located around the primary sheave shaft, and the electric motor is located on an outer side of the sheave drive mechanism.

Another preferred embodiment of the present invention provides a power unit including an engine; and a V-belt continuously variable transmission disposed on a side of a crankcase of the engine for transmitting a driving force of the engine to a driving wheel, the engine having a cylinder block attached to the crankcase, and the V-belt continuously variable transmission including a primary sheave disposed on a primary sheave shaft, to which the driving force of the engine is input, and having a movable sheave and a fixed sheave to form a V-groove for receiving a belt; a secondary sheave disposed adjacent to the primary sheave and on a secondary sheave shaft, from which a driving force for the driving wheel is output, and having a movable sheave and a fixed sheave to form a V-groove for receiving a belt; a V-belt received in the respective V-grooves of the primary sheave and the secondary sheave to transmit a rotational driving force between both the sheaves; an electric motor; a control device for controlling the electric motor; and a sheave drive mechanism for transmitting the driving force of the electric motor to the movable sheave half of the primary sheave to adjust respective groove widths of the primary sheave and the secondary sheave, wherein the movable sheave of the primary sheave and the sheave drive mechanism are located on an opposite side from the crankcase with respect to the fixed sheave of the primary sheave, and the electric motor is located on a side of the cylinder block with respect to a virtual plane including the primary sheave shaft that is substantially perpendicular to a cylinder axis of the cylinder block.

In the power unit having the above-described unique structure, it is preferred that the primary sheave and the electric motor overlap with each other as viewed in the sheave shaft direction.

In addition, it is preferred that a rotary shaft of the electric motor is coincident in direction with the primary sheave shaft.

In addition, it is preferred that the electric motor is located closer to the primary sheave shaft than a speed reduction mechanism of the sheave drive mechanism is, as viewed in the sheave shaft direction.

In addition, it is preferred that the sheave drive mechanism is located around the primary sheave shaft and the electric motor is located on an outer side of the sheave drive mechanism.

In the straddle-type vehicle constructed as described above, the electric motor for controlling the respective groove widths of the primary sheave and the secondary sheave of the V-belt CVT can be located on the outer side of the vehicle body where the electric motor will not prevent the rider from putting his/her foot in place and the influence of heat from the engine is minimal.

Thus, an ATV having a compact, yet durable V-belt CVT achieving a speed change operation highly responsive to the vehicle running condition can be provided in which the electric motor, which is used to control the respective groove widths of the primary sheave and the secondary sheave, does not deteriorate because of heat from the engine.

In addition, in the power unit having the above-described unique structure, the electric motor for controlling the respective groove widths of the primary sheave and the secondary sheave of the V-belt CVT is located spaced away from the cylinder block of the engine which produces a large amount of heat and on the opposite side from the crankcase where the influence of heat from the engine is minimal.

Thus, a power unit having a compact, yet durable V-belt CVT achieving a speed change operation highly responsive to the vehicle running condition can be provided in which the electric motor, which is used to control the respective groove widths of the primary sheave and the secondary sheave, does not deteriorate because of heat from the engine.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 8A is an enlarged view of the outer surface of a support member for supporting an end of a primary sheave shaft shown in FIG. 6.

FIG. 8B is an enlarged view of the inner surface of the support member.

DETAILED DESCRIPTION OF PREFERRED EMBODIMENTS

Preferred embodiments of a straddle-type vehicle and a power unit according to the present invention will hereinafter be described in detail with reference to the drawings.

Figure 1:
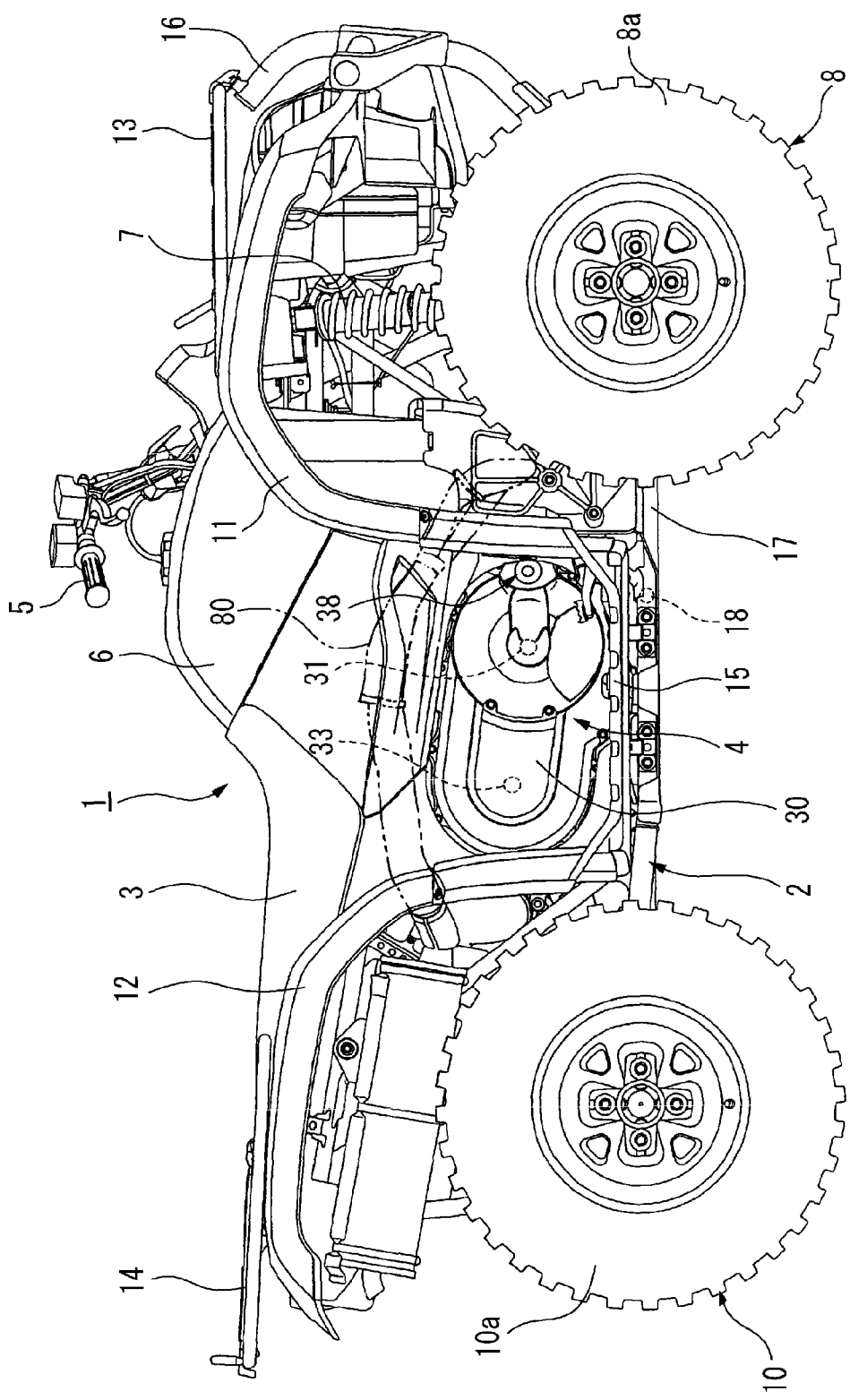
FIG. 1 is a right side view of a straddle-type vehicle incorporating a power unit according to a first preferred embodiment of the present invention.
Figure 2:
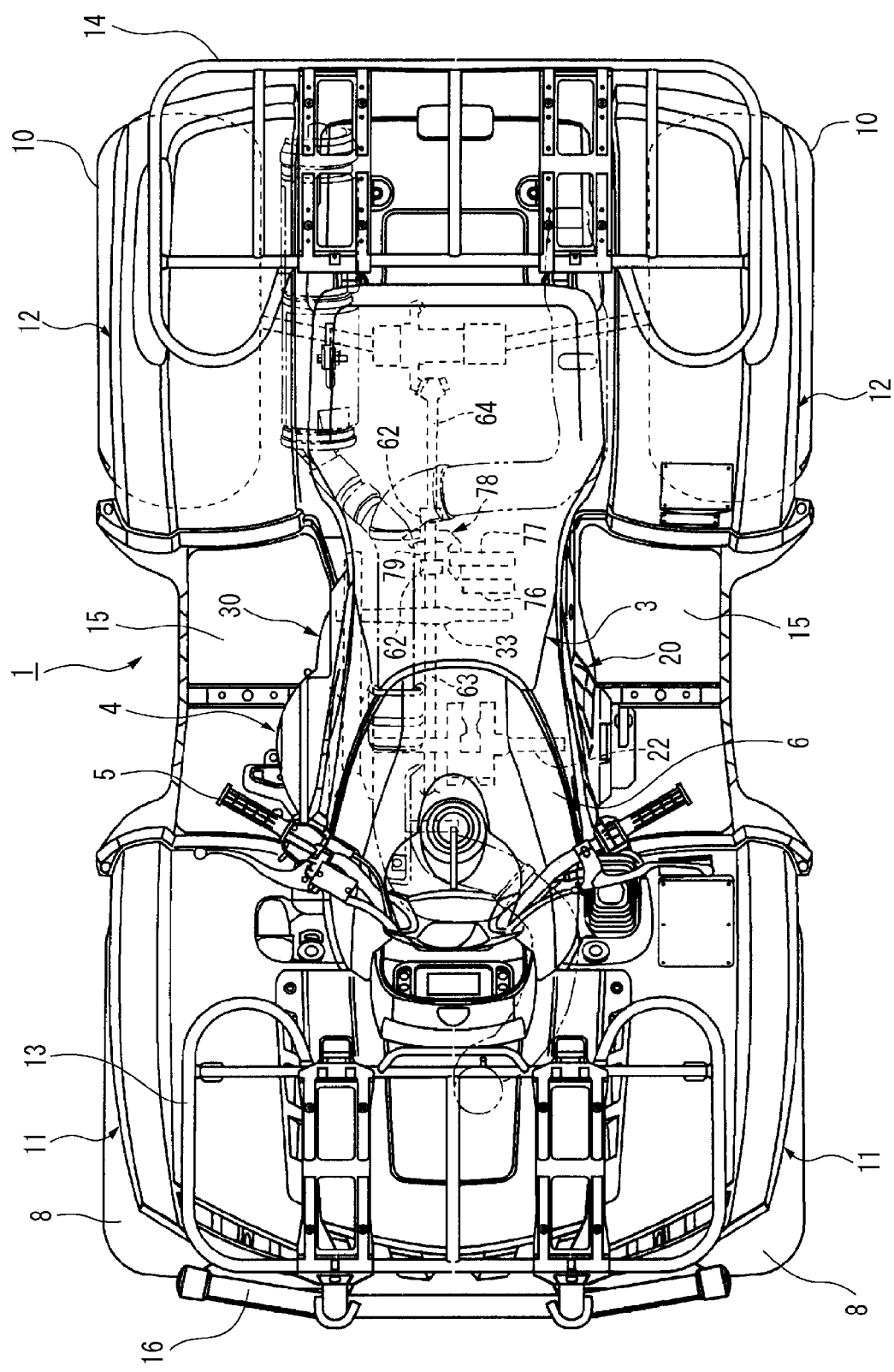
FIG. 2 is a plan view of the straddle-type vehicle shown in FIG. 1.
Figure 3:
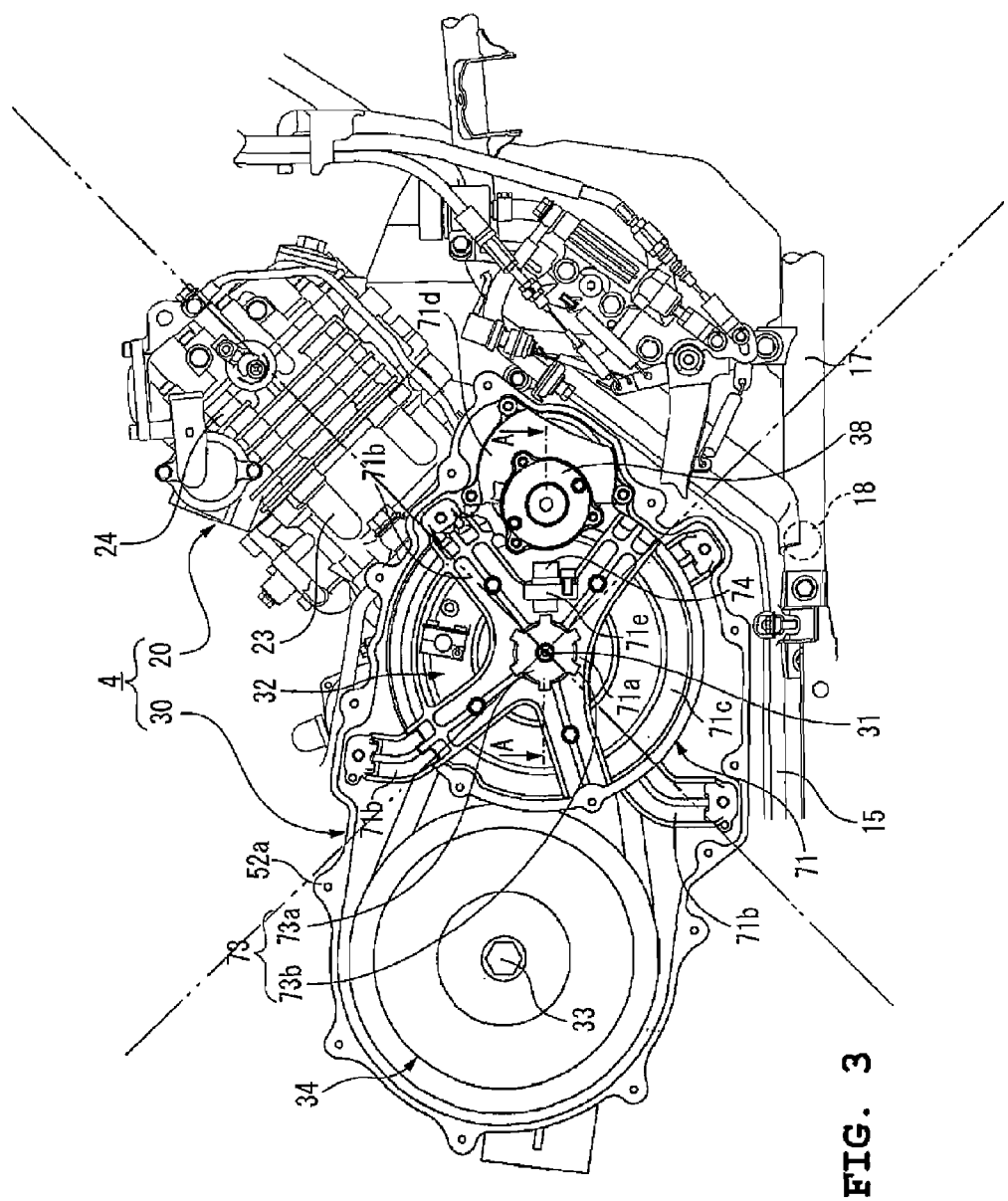
FIG. 3 is a right side view of the power unit mounted in the straddle-type vehicle shown in FIG. 1 with a cover of the V-belt CVT removed.
Figure 4:
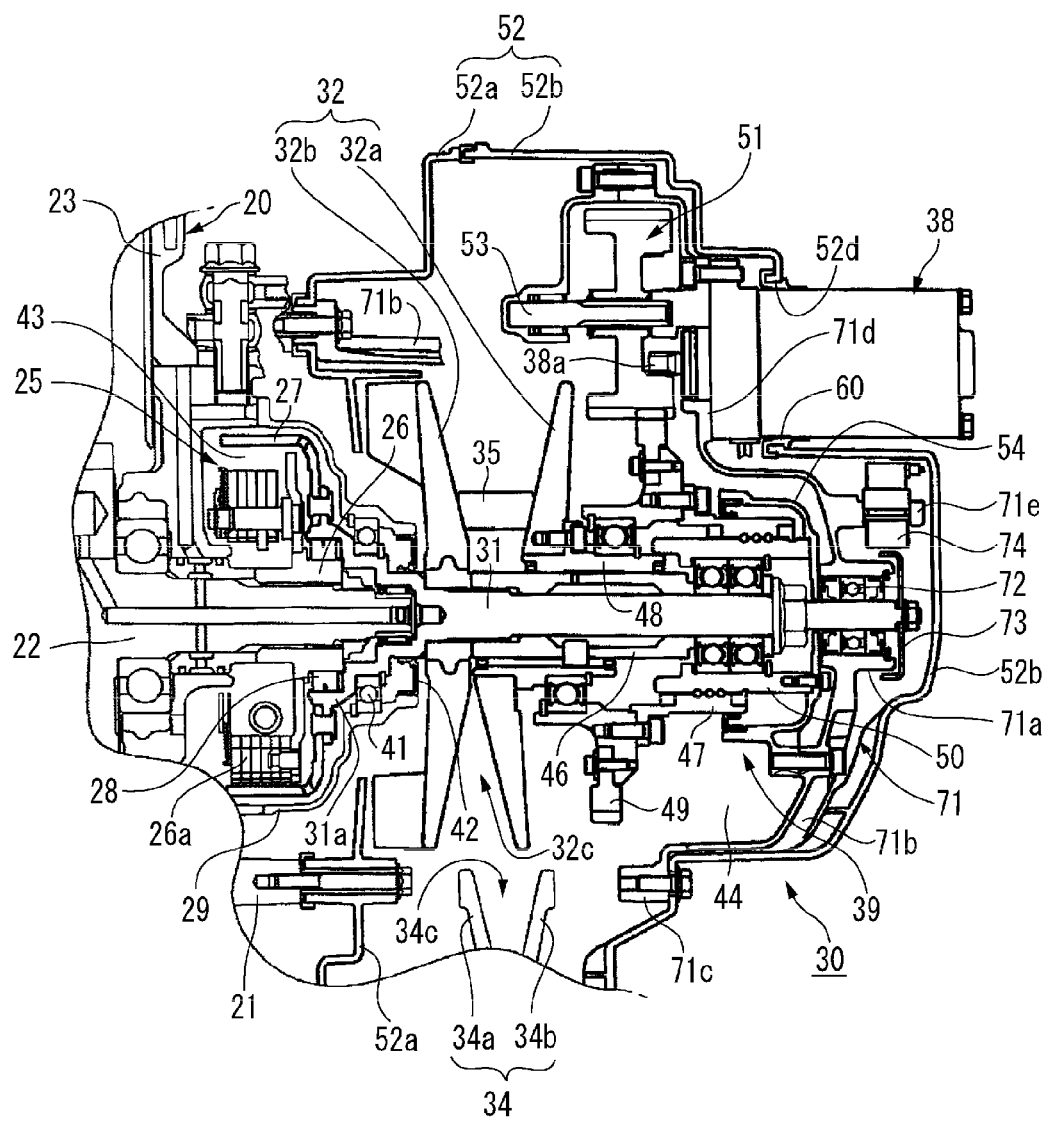
FIG. 4 is a sectional view taken along the line A-A of FIG. 3.
Figure 5:
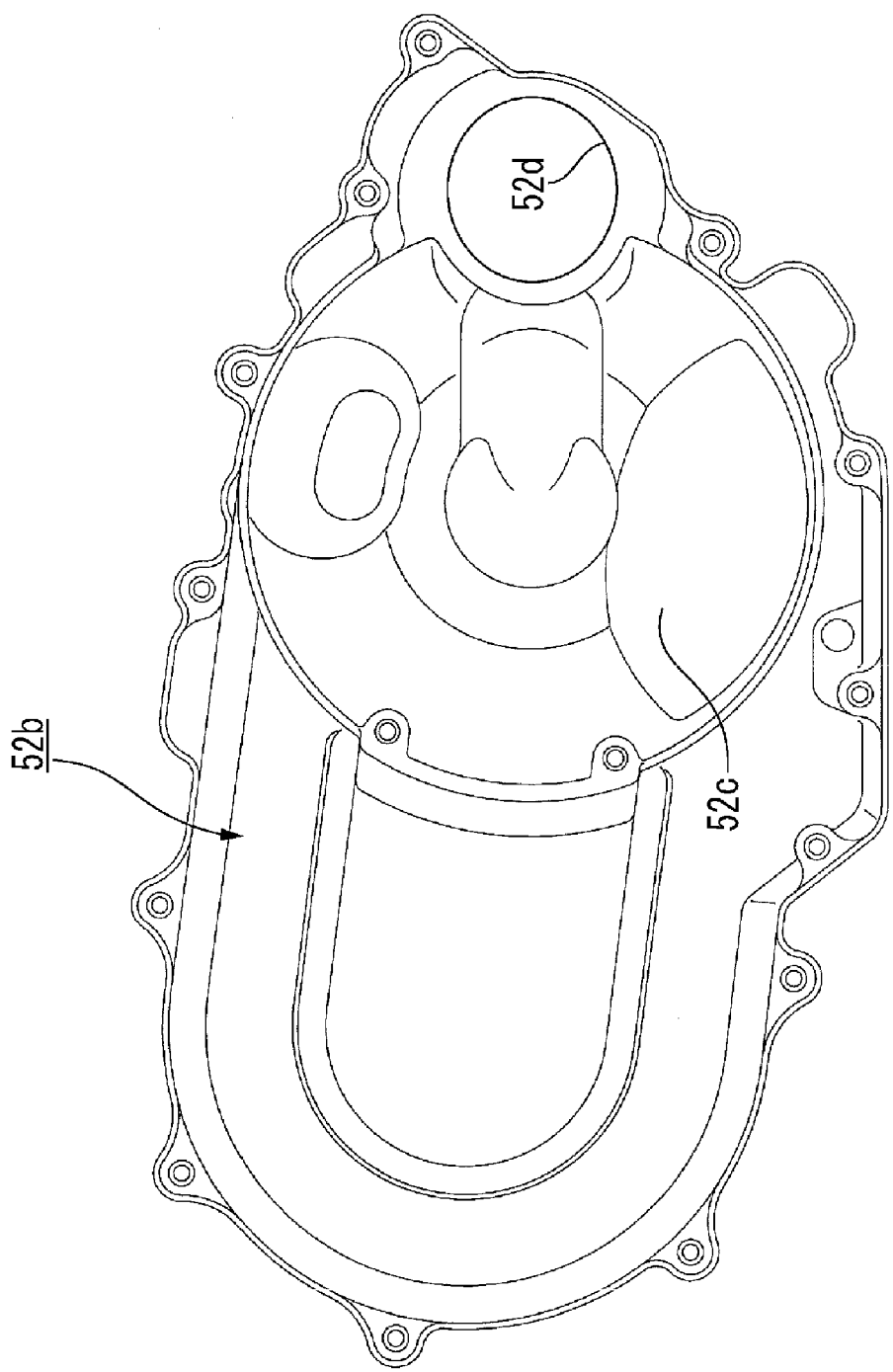
FIG. 5 is a right side view of a cover of a V-belt CVT shown in FIG. 1.

FIGS. 1 through 5 illustrate a straddle-type vehicle and a power unit according to a first preferred embodiment of the present invention. FIG. 1 is a right side view of the straddle-type vehicle incorporating the power unit according to the first preferred embodiment of the present invention. FIG. 2 is a plan view of the straddle-type vehicle shown in FIG. 1. FIG. 3 is a right side view of the power unit mounted in the straddle-type vehicle shown in FIG. 1 with a cover of a V-belt continuously variable transmission (CVT) removed. FIG. 4 is a sectional view taken along the line A-A of FIG. 3. FIG. 5 is a right side view of the cover of the V-belt CVT shown in FIG. 1. In this specification, "left" and "right" refer to the left and right from the rider's point of view.

An ATV (all-terrain vehicle) 1 shown in FIGS. 1 and 2 is preferably a straddle-type vehicle having a seat 3, on which the operator (rider) straddles, located generally in the center of the upper portion of a body frame 2, and a power unit 4 is located below the seat 3. The power unit 4 is an integral unit including an engine 20 and a V-belt CVT 30, for transmitting a driving force of the engine 20 to the wheels, the power unit being attached to a side of a crankcase 21 of the engine 20 (see FIGS. 3 and 4).

The structure of the ATV 1, and the structures of the engine 20 and the V-belt CVT 30 defining the power unit 4 will be described sequentially below.

In the ATV 1, the upper portion of the body frame 2 in front of the seat 3 is provided with a fuel tank 6 and steering handlebars 5, arranged sequentially forward from the seat 3.

Left and right front wheels 8, 8, each having a wide and low-pressure balloon tire 8a, are disposed in the front portion of the body frame 2 via a front wheel suspension device 7, and left and right rear wheels 10, 10, each having a wide and low-pressure balloon tire 10a, are disposed in the rear portion of the frame 2 via a rear wheel suspension device (not shown).

The body frame 2 is also provided with left and right front fenders 11 for covering the upper side of the respective front wheels 8, left and right rear fenders 12 for covering the upper side of the respective rear wheels 10, and carriers 13, 14 provided on the upper side of the fenders 11, 12 to connect the left and right fenders. The body frame 2 is provided with a footboard 15 as a footrest for supporting the foot of the rider on the lower left and right sides of the seat 3. A bumper 16 is provided at the front end of the frame 2.

As shown in FIGS. 1 and 3, the body frame 2 is a double-cradle type in which a pair of left and right side frames 17, 17, prefrably made of steel tubing and arranged generally in a rectangle having a longer dimension sideways, are joined by a number of cross pipes 18 extending in the vehicle width direction.

As shown in FIGS. 1 through 3, the power unit 4 preferably includes a water-cooled 4-cycle single-cylinder engine 20, and a V-belt CVT 30 bolted to the right side of the engine 20, in the direction of the crankshaft.

As shown in FIG. 3, the engine 20 is mounted on the body frame 2 with an axis of its cylinder inclined upward and forward and a crankshaft 22 (see FIG. 4) oriented horizontally in the vehicle width direction. The upper mating surface of a cylinder block 23 is connected to a cylinder head 24, and the lower mating surface of the cylinder block 23 is connected to a crankcase 21 accommodating the crankshaft 22.

A generator (not shown) is mounted on the left end of the crankshaft 22, while a centrifugal clutch mechanism 25 is mounted on the right end thereof.

The centrifugal clutch mechanism 25 includes an inner drum 26 spline-coupled with the crankshaft 22 to rotate together therewith, an outer drum 27 disposed to surround an outer periphery of the inner drum 26, and a one-way clutch 28 interposed between bosses of the pair of drums 26, 27.

As the rotational speed of the crankshaft 22 increases, a weight 26a of the inner drum 26 is pressed against the outer drum 27 by centrifugal force so that the outer drum 27 rotates.

The one-way clutch 28 functions to transmit power from the rear wheels to the crankshaft 22 in reverse in order to provide engine braking.

As shown in FIG. 4, the V-belt CVT 30 includes a primary sheave 32 disposed on a primary sheave shaft 31, to which a driving force of the engine 20 is input from the crankshaft 22 via the centrifugal clutch mechanism 25, and having a movable sheave half 32a and a fixed sheave half 32b to form a V-groove 32c for receiving a belt; a secondary sheave 34 disposed on a secondary sheave shaft 33 (see FIG. 2), from which a driving force for the driving wheels is output, and having a movable sheave half 34a and a fixed sheave half 34b to form a V-groove 34c for receiving a belt; a V-belt 35 received in the respective V-grooves 32c, 34c of the primary sheave 32 and the secondary sheave 34 to transmit a rotational driving force between both the sheaves; an electric motor 38; a control device (not shown) for controlling the electric motor 38 according to the vehicle running condition (operating condition); and a sheave drive mechanism 39 for transmitting a driving force of the electric motor 38 to the movable sheave half 32a of the primary sheave 32 to control the respective groove widths of the primary sheave 32 and the secondary sheave 34.

The primary sheave shaft 31 is coaxial with the crankshaft 22, and rotatably supported by the centrifugal clutch mechanism 25 and a support member 71 such that the primary sheave shaft 31 is on the right end of the crankshaft 22. The left end of the primary sheave shaft 31 facing the crankshaft 22 is integral with a skirt 31a passing through an opening in the center of an end of a clutch cover 29 and surrounding the right end of the crankshaft 22. The skirt 31a is riveted or otherwise secured to the outer drum 27 of the centrifugal clutch mechanism 25.

The right end of the primary sheave shaft 31 is rotatably supported, via a bearing 72, on the center of the support member 71 secured to the crankcase 21.

As shown in FIG. 3, the die-cast aluminum support member 71 includes a bearing holding portion 71a for supporting the right end of the primary sheave shaft 31 via the bearing 72, four legs 71b extending in four directions from the bearing holding portion 71a, an annular coupling portion 71c for coupling the legs 71b with a specific radius, a motor attachment portion 71d provided on the annular coupling portion 71c, and a sensor attachment portion 71e. Ends of the legs 71b are bolted to the crankcase 21.

The primary sheave shaft 31 supported as described above becomes connected through the centrifugal clutch mechanism 25 to the crankshaft 22 in order to rotate together therewith, when the rotational speed of the crankshaft 22 reaches a specific speed or higher.

The base end of the clutch cover 29 is secured to the crankcase 21. A portion of the clutch cover 29 around the opening at the center of its end is provided with a bearing 41 for rotatably supporting the primary sheave shaft 31, and a seal member 42 for sealing between the opening and the outer periphery of the skirt 31a. The clutch cover 29 surrounds a space 43 accommodating the centrifugal clutch mechanism 25 in a liquid-tight manner to prevent oil used for the centrifugal clutch mechanism 25 from leaking into a belt chamber 44 of the V-belt CVT 30.

As shown in FIGS. 3 and 4, a measurement plate 73 as a part to be detected for measurement of rotational speed is secured to the right end of the primary sheave shaft 31 by a nut. As shown in FIG. 3, the measurement plate 73 is defined by a disk 73a and projections for measurement 73b provided on the outer periphery of the disk 73a at regular intervals. A rotational speed sensor 74 for measuring rotation of the primary sheave shaft 31 based on the passing of the projections for measurement 73b is attached around the outer periphery of the measurement plate 73 via a sensor attachment portion 71e of the support member 71.

In this preferred embodiment, as shown in FIG. 4, the movable sheave half 32a of the primary sheave 32 is located on the outer side in the vehicle width direction with respect to the fixed sheave half 32b of the primary sheave 32.

Also, as shown in FIG. 4, the outer periphery of the secondary sheave 34 is located adjacent to the outer periphery of the primary sheave 32. This can effectively minimize the size of the V-belt CVT 30 in the longitudinal direction of the vehicle for compactness.

As shown in FIG. 4, the sheave drive mechanism 39 includes a guide tube 46 spline-fitted or otherwise mounted on the outer periphery of the primary sheave shaft 31 so as not to rotate relative thereto, a slider 48 mounted on the outer periphery of the guide tube 46 so as to be movable only axially and to which the movable sheave half 32a is secured, a rotary slide member 47 rotatably coupled to the outer periphery of the slider 48 via a bearing so as not to move axially relative thereto and to which a reciprocating gear 49 is secured, a feed guide portion 50 having a ball screw portion screwed on the rotary slide member 47 to move the rotary slide member 47 in the direction of the primary sheave shaft 31 according to the rotation direction and amount of the reciprocating gear 49, and a speed reduction gear mechanism 51 for reducing the rotational speed of the electric motor 38 and inputting the reduced rotation to the reciprocating gear 49. The feed guide portion 50 is bolted to an outer member 54 for covering an end of the rotary slide member 47, and the outer member 54 is bolted to the support member 71.

The sheave drive mechanism 39 controls axial movement of the movable sheave half 32a according to the rotation input from the electric motor 38 to the reciprocating gear 49 via the speed reduction mechanism 51.

In the power unit 4 of the first preferred embodiment, the electric motor 38 is located closer to the primary sheave shaft 31 than the speed reduction gear mechanism 51 of the sheave drive mechanism 39 is, as viewed in the sheave shaft direction, and secured to the motor attachment portion 71d of the support member 71 from the outer side in the vehicle width direction. That is, a driving force of the electric motor 38 can be transmitted to the reciprocating gear 49 via the speed reduction gear mechanism 51 rotatably supported on a support shaft 53, the speed reduction gear mechanism 51 being located farther from the reciprocating gear 49 than a motor shaft 38a of the electric motor 38 is.

In this way, the power transmission path from the electric motor 38 to the reciprocating gear 49 via the support shaft 53 of the speed reduction gear mechanism 51 can be inverted to the primary sheave shaft 31 side, thereby placing the electric motor 38 closer to the primary sheave shaft 31.

Thus, the imbalanced weight of the power unit 4 due to the heavy electric motor 38 can be improved.

The movable sheave half 34a of the secondary sheave 34 is normally urged by a spring member in the direction of reducing the groove width, so that the groove width is controlled based on the balance between the urging force and the tension of the wrapped V-belt 35.

Thus, when the groove width of the primary sheave 32 is controlled by operation of the sheave drive mechanism 39 and hence the wrapping diameter of the V-belt 35 around the primary sheave 32 is changed, the tension of the V-belt 35 and hence the groove width of the secondary sheave 34 are changed accordingly for a specific speed change ratio.

Out of the constituent parts of the V-belt CVT 30, those other than the electric motor 38 are accommodated in a transmission case 52 connected to a side of the crankcase 21. The plastic or resin transmission case 52 includes a lower case 52a connected to a mating surface of the crankcase 21 on the right side in the crankshaft direction, and an upper case 52b removably attached to the lower case 52a, and defines the belt chamber 44 beside the crankcase 21.

As shown in FIG. 5, the upper case 52b is a cover of the V-belt CVT 30 and is provided with a recess 52c for ensuring a space for the foot of the rider so that the projecting upper case 52b will not interfere with the rider placing his/her foot on the footboard 15 as a footrest. In addition, the upper case 52b is provided with a motor attachment hole 52d for allowing a housing of the electric motor 38 to pass therethrough and sealed by a seal member 60 (see FIG. 4).

In this preferred embodiment, as shown in FIG. 4, the sheave drive mechanism 39 is located on the outer side in the vehicle width direction with respect to the movable sheave half 32a of the primary sheave 32.

The footboard 15 is located on the outer side of the V-belt CVT 30 in the vehicle width direction, as shown in FIG. 2, and below the primary sheave shaft 31 and the secondary sheave shaft 33.

In the ATV 1 of this preferred embodiment, as shown in FIG. 2, the output of the secondary sheave shaft 33 of the power unit 4 is transmitted to an intermediate shaft 76 and an output shaft 77 via a suitable gear train, and then from the output shaft 77 to a power transmission shaft 79 disposed in the longitudinal direction of the vehicle via a bevel gear mechanism 78.

The power is then transmitted from the power transmission shaft 79 via a front/rear universal joint 62 to a front wheel drive shaft 63 and a rear wheel drive shaft 64 which are connected to the left and right front wheels 8 and the left and right rear wheels 10, respectively.

As described above, in the power unit of the ATV 1 according to this preferred embodiment, at least a portion of the electric motor 38, which is used to drive the sheave drive mechanism 39 for controlling the respective groove widths of the primary sheave 32 and the secondary sheave 34 of the V-belt CVT 30, is located above and in front of the primary sheave shaft 31 as viewed in the sheave shaft direction. In addition, the electric motor 38 is disposed so as to overlap with the primary sheave 32 as viewed in the sheave shaft direction.

In this way, a gap through which the foot of the rider can get in and out easily can be provided between the footboard 15, which is located on the outer side of the V-belt CVT 30 in the vehicle width direction and below the primary sheave shaft 31 and the secondary sheave shaft 33, and the electric motor 38 located above the vicinity of the front end of the footrest 15. That is, the electric motor 38 does not prevent the rider from putting his/her foot in place.

Further, the electric motor 38 is located spaced away from the cylinder block 23 of the engine 20 which produces substantial heat and on the outer side of the vehicle body where the influence of heat from the engine 20 is less likely, and thus does not deteriorate because of heat from the engine 20. Therefore, a speed change operation that is highly responsive to the vehicle running condition can be achieved with a compact, yet durable structure.

Thus, an ATV 1 having a compact, yet durable V-belt CVT 30 achieving a speed change operation that is highly responsive to the vehicle running condition (operating condition of the engine 20) can be provided in which the electric motor 38, which is used to control the respective groove widths of the primary sheave 32 and the secondary sheave 34, does not deteriorate because of heat from the engine 20.

In this preferred embodiment, as shown in FIG. 1, since the electric motor 38 is located in front of the V-belt CVT 30, the exhaust pipe 80 of the engine 20 can be disposed above and along the V-belt CVT 30.

This arrangement can prevent the electric motor 38 from interfering with the foot of the rider and the exhaust pipe 80.

In the ATV 1 of this preferred embodiment, as shown in FIG. 1, the front fenders 11 are disposed in front of the V-belt CVT 30.

Since the electric motor 38 is disposed in front of the belt chamber 44 and between the belt chamber 44 and the front fenders 11 as a result, the electric motor 38 can be disposed so as not to prevent the rider from placing his/her foot on the footboard 15 located behind the front fenders 11 and so that the front fenders 11 can block mud, or the like, from splashing from the front wheels 8.

In addition, arranging the electric motor 38 such that the primary sheave 32 and the electric motor 38 overlap with each other as viewed in the sheave shaft direction can prevent the V-belt CVT 30 from increasing in the longitudinal direction of the vehicle and hence can provide a compact V-belt CVT 30. In the above preferred embodiment, the primary sheave shaft 31 and the motor shaft 38a of the electric motor 38 are preferably disposed substantially parallel to each other. However, the primary sheave shaft and the motor shaft may be disposed substantially perpendicular to each other, for example with the use of a structure where the output from the electric motor 38 is received by a bevel gear or the like.

As disclosed in the above preferred embodiment, the motor shaft 38a of the electric motor 38 is coincident in direction with the primary sheave shaft 31, which can minimize the width of the electric motor 38 as viewed in the direction of the primary sheave shaft 31 so that the electric motor 38 will not prevent the rider from putting his/her foot in place. In addition, it is possible to prevent the V-belt CVT 30 from increasing in the longitudinal direction of the vehicle and hence provide a compact V-belt CVT 30.

Moreover, disposing the electric motor 38 closer to the primary sheave shaft 31 than the speed reduction mechanism 51 of the sheave drive mechanism 39 is, as viewed in the sheave shaft direction, can prevent the V-belt CVT 30 from increasing in the longitudinal direction of the vehicle, with the electric motor 38 located spaced away from the primary sheave shaft 31, and can allow the heavy electric motor 38 to be located closer to the center of the vehicle.

Further, disposing the sheave drive mechanism 39 around the primary sheave shaft 31 and disposing the electric motor 38 on the outer side of the sheave drive mechanism 39 allows the sheave drive mechanism 39 and the electric motor 38 to be disposed so as not to overlap with each other in the vehicle width direction. This can prevent the belt chamber from increasing in the vehicle width direction and hence can provide a more comfortable vehicle for the rider to ride on by putting his/her foot in place. On the other hand, a wide belt chamber would make a wider vehicle and thus make it difficult for the rider to put both his/her feet on the ground easily and stably.

Figure 6:
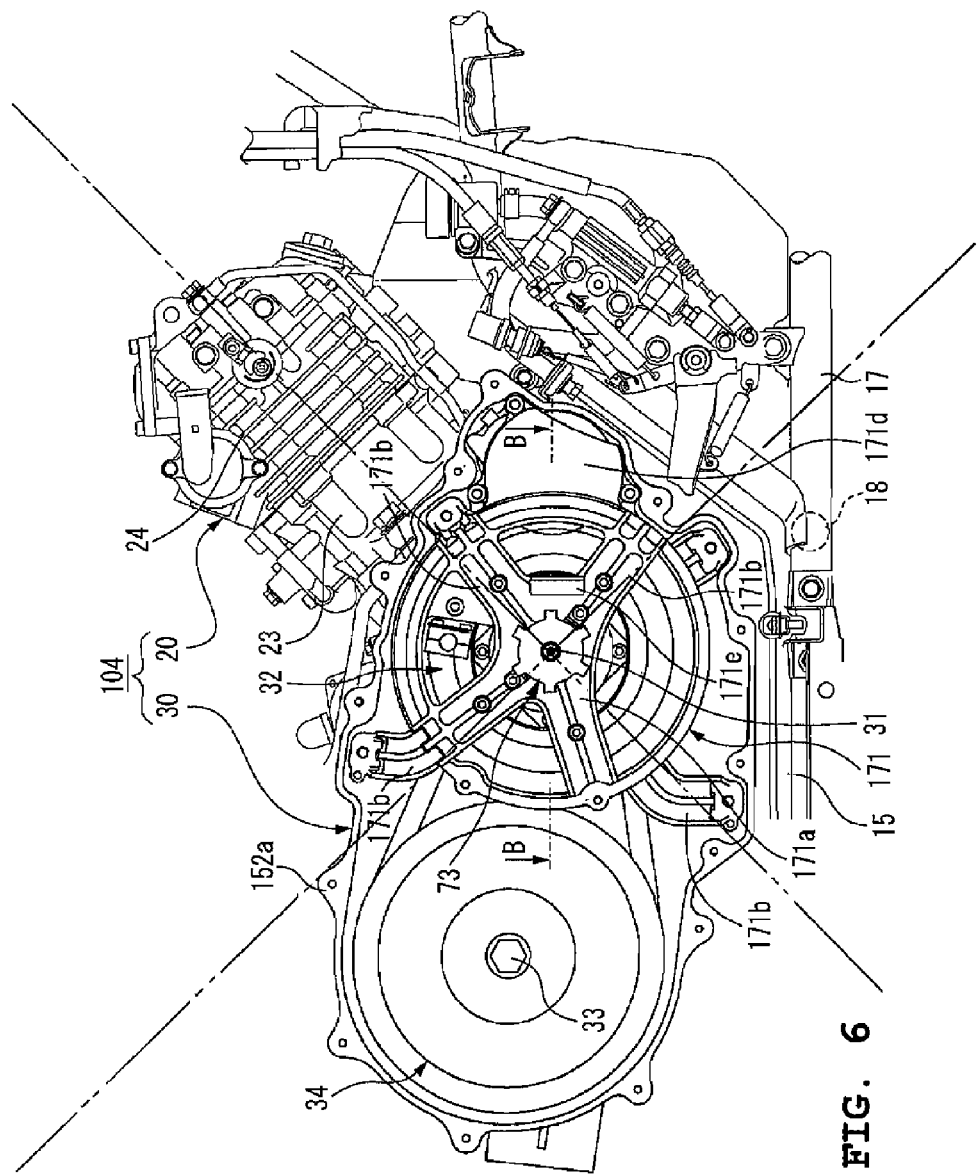
FIG. 6 is a right side view of a power unit mounted in a straddle-type vehicle according to a second preferred embodiment of the present invention.
Figure 7:
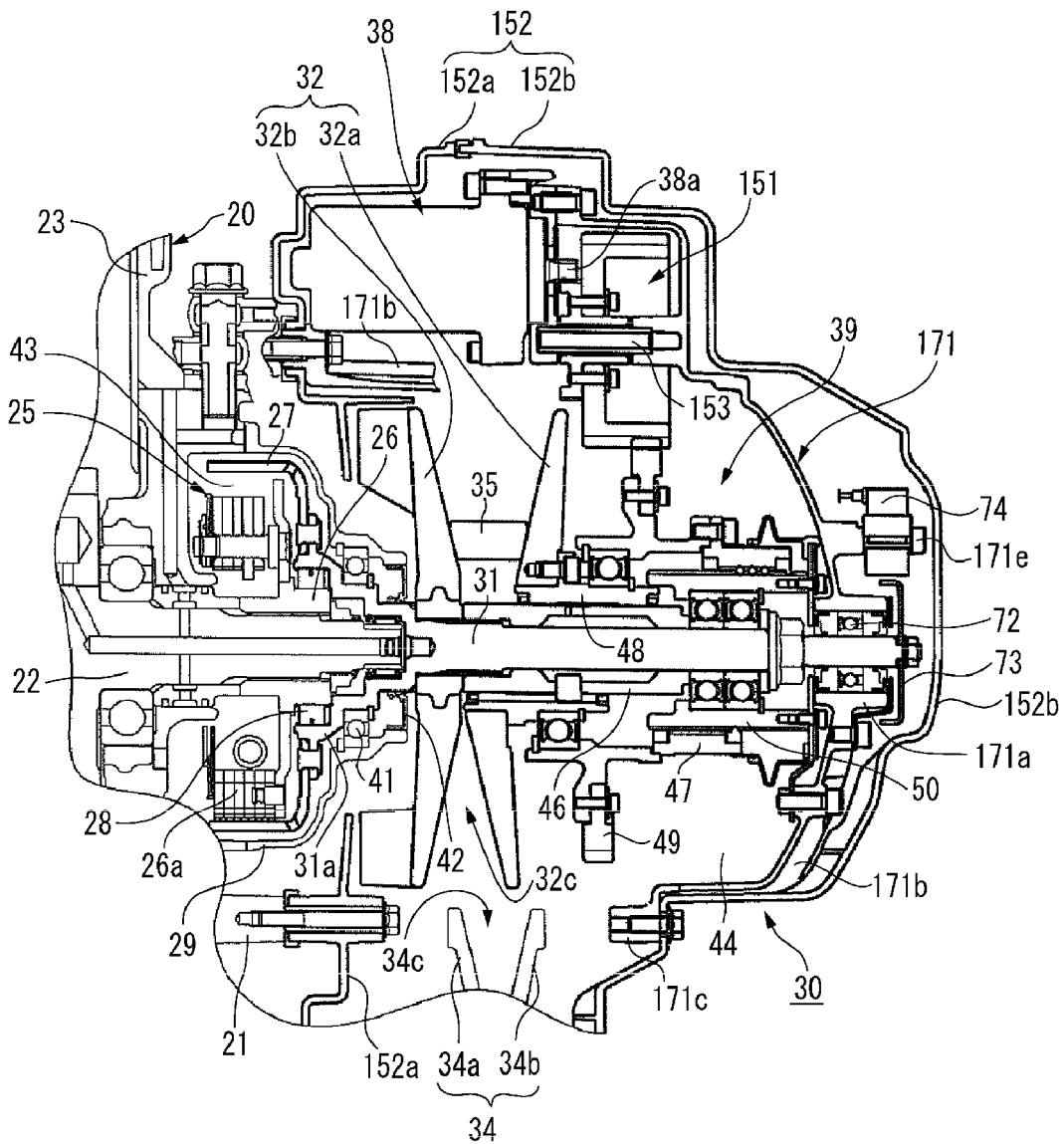
FIG. 7 is a sectional view taken along the line B-B of FIG. 6.
Figure 9:
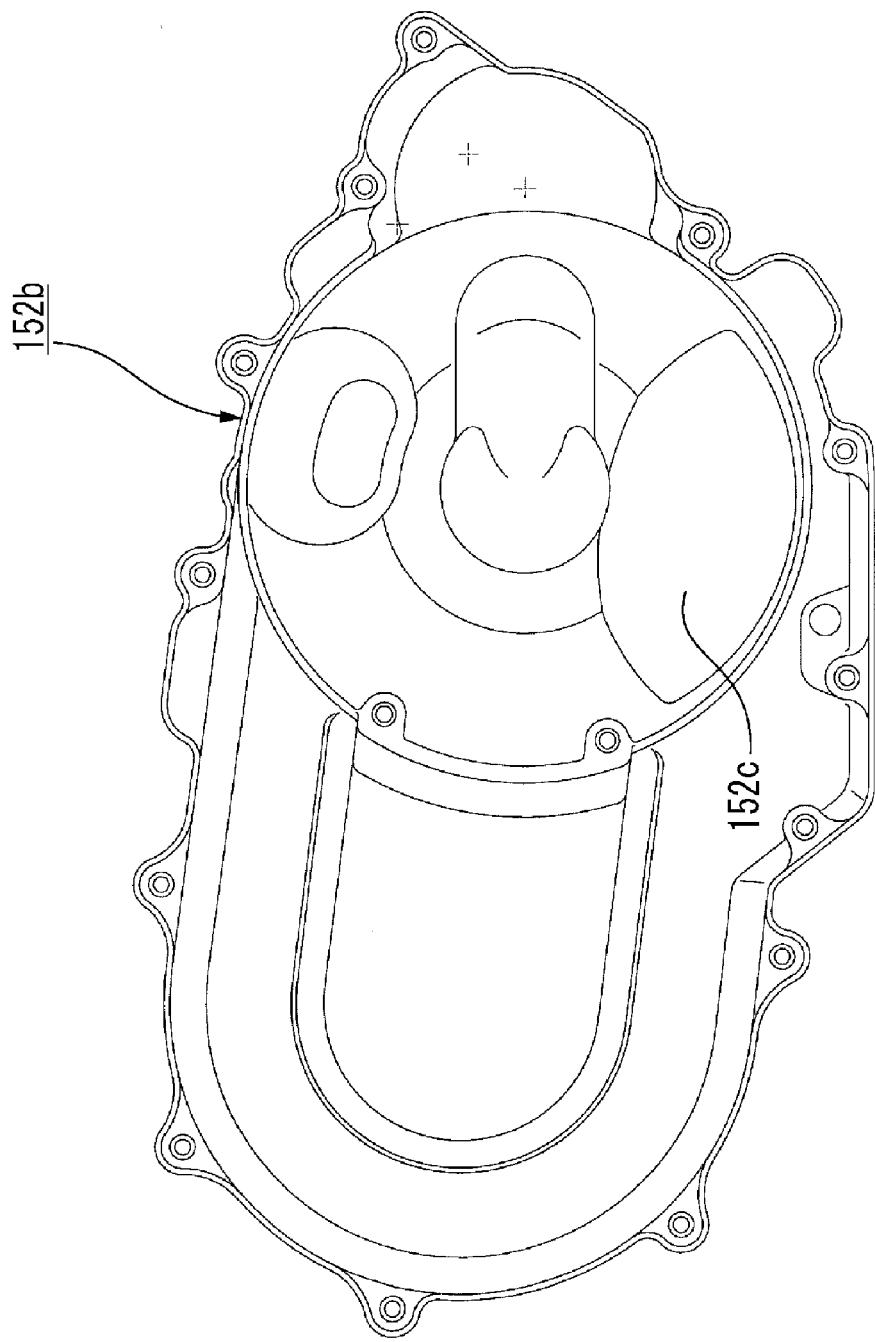
FIG. 9 is a right side view of a cover of a V-belt CVT shown in FIG. 6.

FIGS. 6 through 9 illustrate a power unit according to a second preferred embodiment of the present invention. FIG. 6 is a right side view of the power unit of the second preferred embodiment. FIG. 7 is a sectional view taken along the line B-B of FIG. 6. FIG. 8A is an enlarged view of the outer surface of a support member for supporting an end of a primary sheave shaft shown in FIG. 6. FIG. 8B is an enlarged view of the inner surface of the support member. FIG. 9 is a right side view of a cover of a V-belt CVT 30 shown in FIG. 6. Constituent parts of a power unit 104 according to the second preferred embodiment which are similar or identical to those of the power unit 4 according to the above-described first preferred embodiment are given the same reference numerals and detailed description thereof is omitted.

As shown in FIGS. 6 and 7, the power unit 104 of the second preferred embodiment is an integral unit defined by an engine 20 and a V-belt CVT 30 for transmitting a driving force of the engine 20 to driving wheels which are attached to a side of a crankcase 21 of the engine 20.

The power unit 104 of the second preferred embodiment is similar to the power unit 4 of the above-described first preferred embodiment in that the sheave drive mechanism 39 is located around the primary sheave shaft 31 and that the electric motor 38 is located on the outer side of the sheave drive mechanism 39, but different in that the electric motor 38 for transmitting the driving force to the sheave drive mechanism 39 is also housed in a transmission case 152.

As shown in FIGS. 6, 8A, and 8B, a support member 171 in the power unit 104 of the second preferred embodiment includes a bearing holding portion 171a for supporting the right end of the primary sheave shaft 31 via a bearing 72, four legs 171b extending in four directions from the bearing holding portion 171a, an annular coupling portion 171c for coupling the legs 171b with a specific radius, a speed reduction gear mechanism attachment portion 171d provided on the annular coupling portion 171c, and a sensor attachment portion 171e.

A speed reduction gear mechanism 151 is rotatably supported on the speed reduction gear mechanism attachment portion 171d via a support shaft 153, and the electric motor 38 is secured thereto from the inner side in the vehicle width direction. Thus, the driving force of the electric motor 38 can be transmitted to the reciprocating gear 49 via the speed reduction gear mechanism 151 rotatably supported on the support shaft 153.

As shown in FIG. 7, the electric motor 38 is housed in the transmission case 152 defined by a lower case 152a and an upper case 152b.

Thus, the power unit 104 of the second preferred embodiment has an advantage of protecting the electric motor 38 from pebbles or the like kicked-up from the ground during operation of the vehicle, in addition to the functions and advantageous effects of the power unit 4 of the above-described first preferred embodiment.

Further, as shown in FIG. 9, the upper case 152b defining the transmission case 152 is provided with a recess 152c to avoid interference with the foot of the rider, but may not necessarily be provided with a motor attachment hole 52d or a seal member 60 of the upper case 52b defining the transmission case 52 of the above-described first preferred embodiment, thereby simplifying the structure and facilitating assembly.

Figure 10:
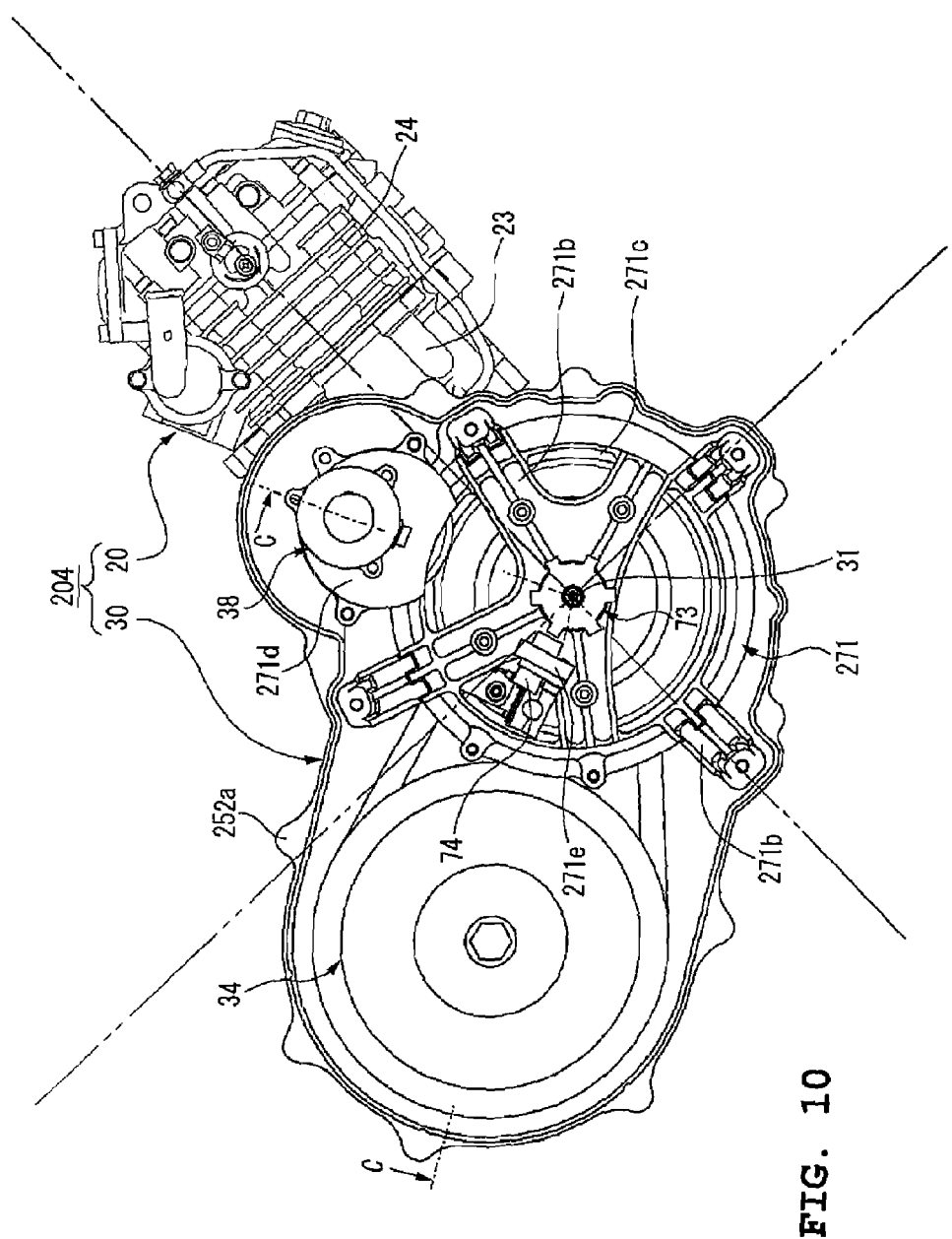
FIG. 10 is a right side view of a power unit mounted in a straddle-type vehicle according to a third preferred embodiment of the present invention.
Figure 11:
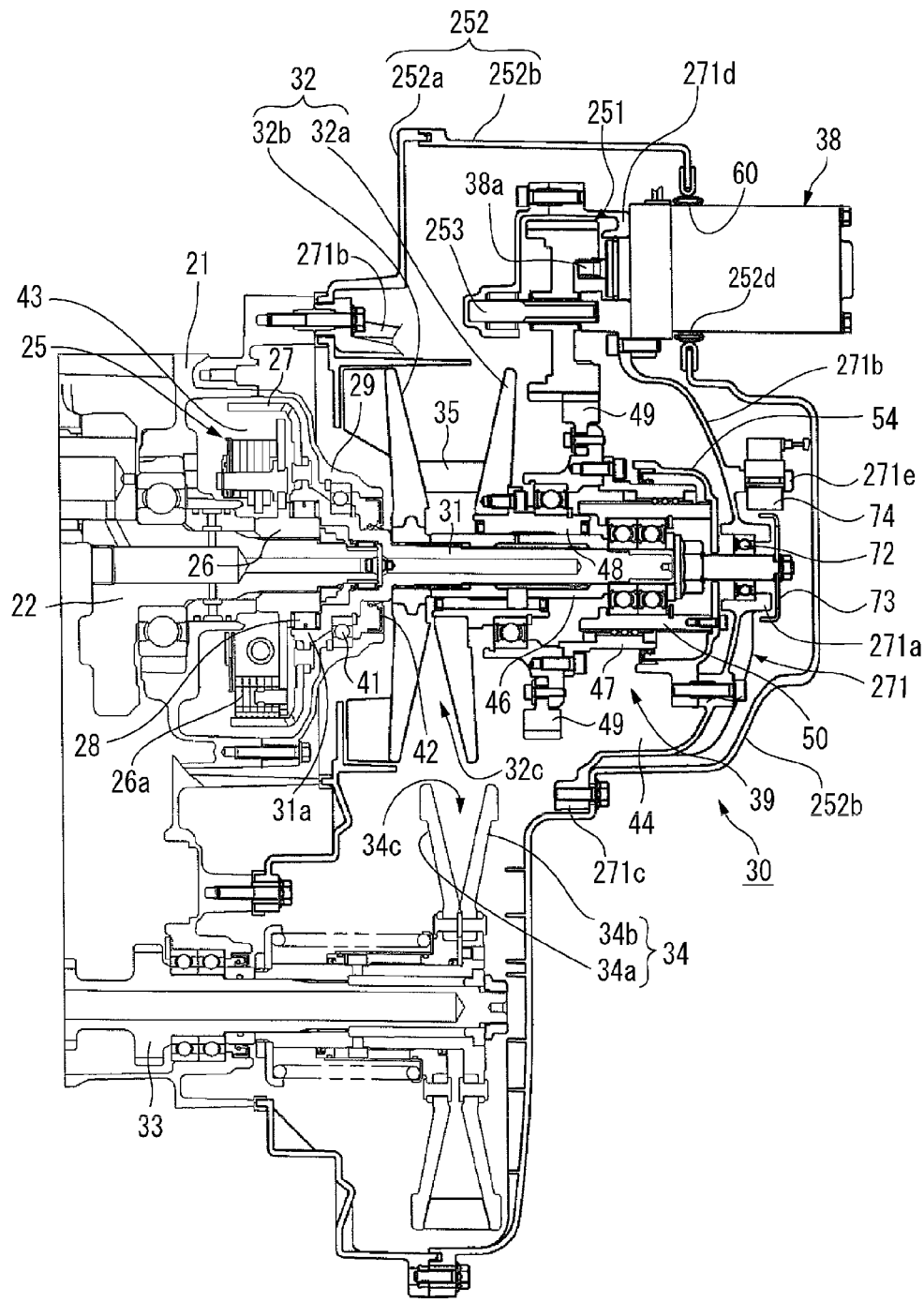
FIG. 11 is a sectional view taken along the line C-C of FIG. 10.
Figure 12A:
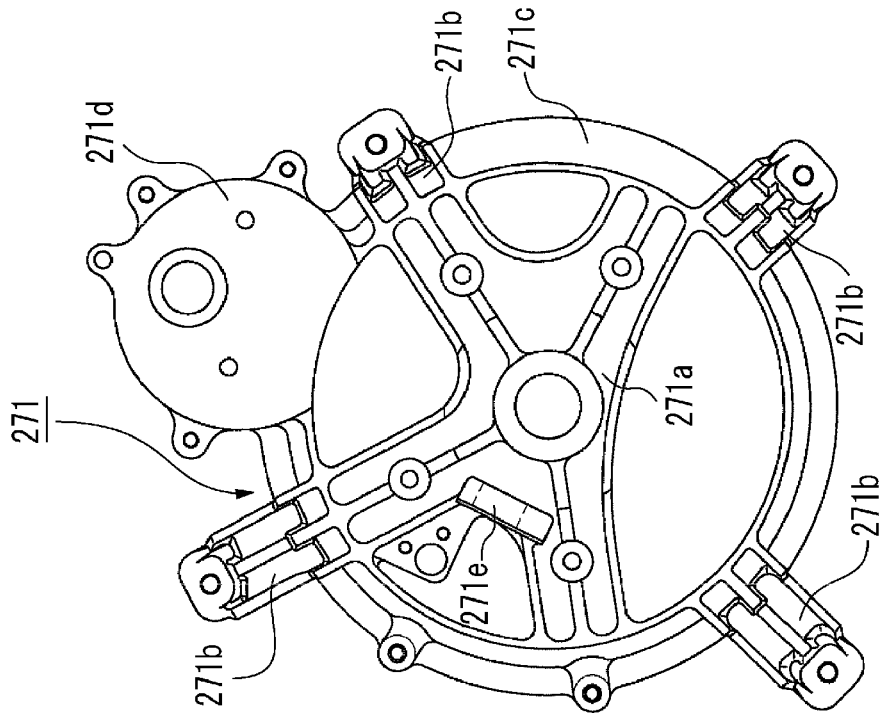
FIG. 12A is an enlarged view of the outer surface of a support member for supporting an end of a primary sheave shaft shown in FIG. 10.
Figure 12B:
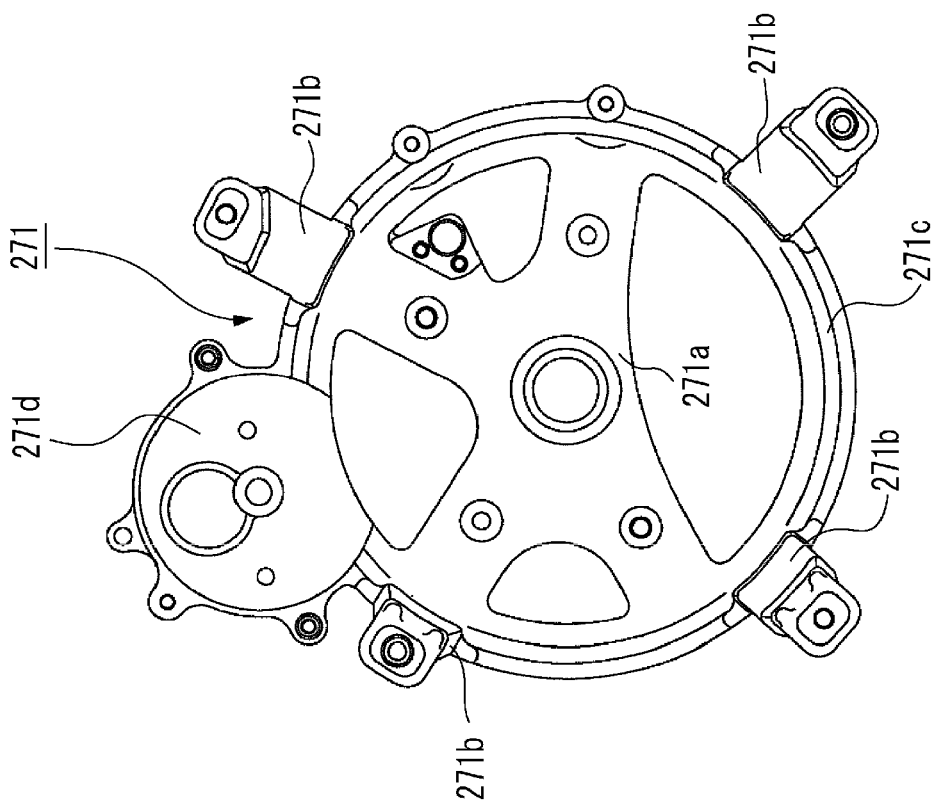
FIG. 12B is an enlarged view of the inner surface of the support member.
Figure 13:
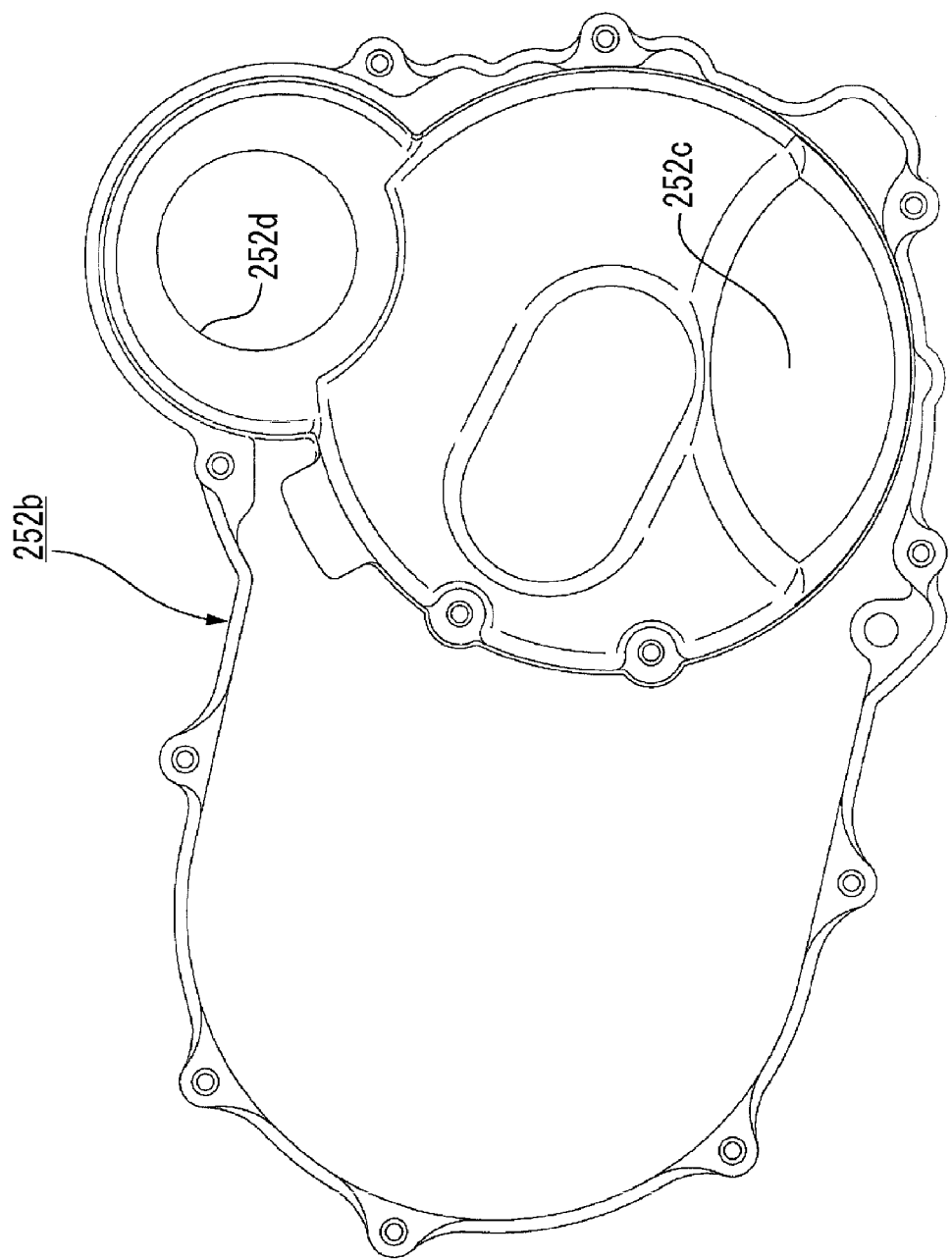
FIG. 13 is a right side view of a cover of a V-belt CVT shown in FIG. 10.

FIGS. 10 through 13 illustrate a power unit according to a third preferred embodiment of the present invention. FIG. 10 is a right side view of the power unit of the third preferred embodiment. FIG. 11 is a vertical sectional view taken along the line C-C of FIG. 10. FIG. 12A is an enlarged view of the outer surface of a support member for supporting an end of a primary sheave shaft shown in FIG. 10. FIG. 12B is an enlarged view of the inner surface of the support member. FIG. 13 is a right side view of a cover of a V-belt CVT shown in FIG. 10. Constituent parts of a power unit 204 according to the third preferred embodiment which are similar or identical to those of the power unit 4 according to the above-described first preferred embodiment are given the same reference numerals and detailed description thereof is omitted.

As shown in FIGS. 10 and 11, the power unit 204 of the third preferred embodiment is an integral unit defined by an engine 20 and a V-belt CVT 30 for transmitting a driving force of the engine 20 to driving wheels which are attached to a side of a crankcase 21 of the engine 20.

The power unit 204 of the third preferred embodiment is similar to the power unit 4 of the above-described first preferred embodiment in that the sheave drive mechanism 39 is located around the primary sheave shaft 31 and that the electric motor 38 is located on the outer side of the sheave drive mechanism 39, but different in that the electric motor 38 for transmitting the driving force to the sheave drive mechanism 39 is located further above the primary sheave shaft 31 as viewed in the sheave shaft direction.

As shown in FIGS. 10 and 12, a support member 271 in the power unit 204 of the second preferred embodiment includes a bearing holding portion 271a for supporting the right end of the primary sheave shaft 31 via a bearing 72, four legs 271b extending in four directions from the bearing holding portion 271a, an annular coupling portion 271c for coupling the legs 271b with a specific radius, a motor attachment portion 271d provided on the annular coupling portion 271c, and a sensor attachment portion 271e.

The electric motor 38 is secured to the motor attachment portion 271d, which is provided on the upper side of the support member 271, from the outer side in the vehicle width direction. The constituent parts of the V-belt CVT 30 other than the electric motor 38 are accommodated in a transmission case 252 connected to a side of the crankcase 21. Thus, the driving force of the electric motor 38 can be transmitted to the reciprocating gear 49 via the speed reduction gear mechanism 251 rotatably supported on the support shaft 253.

The plastic or resin transmission case 252 is defined by a lower case 252a connected to a mating surface of the crankcase 21 on the right side in the crankshaft direction, and an upper case 252b removably attached to the lower case 252a.

As shown in FIG. 13, the upper case 252b as a cover of the V-belt CVT 30 is provided with a recess 252c for ensuring a space for the foot of the rider so that the projecting upper case 252b will not interfere with the foot of the rider. In addition, the upper case 252b is provided with a motor attachment hole 252d for allowing a housing of the electric motor 38 to pass therethrough and sealed by a seal member 60 (see FIG. 11).

Thus, in the power unit 204 of the third preferred embodiment, the electric motor 38 is located above the primary sheave shaft 31 and therefore, a large gap can be ensured between the electric motor 38 and the footboard 15, further facilitating the rider putting his/her foot in place compared to the power unit 4 of the above-described first preferred embodiment.

The present invention can be applied to straddle-type vehicles other than ATVs (all-terrain vehicles) such as those disclosed in the above preferred embodiments. For example, the vehicles according to the present invention include motorcycles, motorbikes, scooters, buggies, golf carts, and other various vehicles having a seat that the rider straddles.

It is to be understood that the footrest according to the preferred embodiments of the present invention is not limited to the footboard 15 in the above preferred embodiments but may be a rod-like step or may have another suitable configuration.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddle-type vehicle comprising:
  a V-belt continuously variable transmission arranged to transmit a driving force of an engine to a driving wheel, the V-belt continuously variable transmission including:
    a primary sheave disposed on a primary sheave shaft, to which the driving force of the engine is input, and including a movable sheave half and a fixed sheave half arranged to define a V-groove adapted to receive a belt;
    a secondary sheave disposed on a secondary sheave shaft, from which a driving force for the driving wheel is output, and including a movable sheave half and a fixed sheave half arranged to define a V-groove adapted to receive a belt;
    a V-belt received in the respective V-grooves of the primary sheave and the secondary sheave to transmit a rotational driving force between the primary and secondary sheaves;
    an electric motor;
    a control device arranged to control the electric motor; and
    a sheave drive mechanism arranged to transmit a driving force of the electric motor to the movable sheave half of the primary sheave to control respective groove widths of the primary sheave and the secondary sheave; wherein
  the movable sheave half of the primary sheave is located on an outer side in a vehicle width direction with respect to the fixed sheave half of the primary sheave;
  the sheave drive mechanism is located on an outer side in the vehicle width direction with respect to the movable sheave half of the primary sheave;
  a footrest of the straddle-type vehicle is located on an outer side of the V-belt continuously variable transmission in the vehicle width direction and below the primary sheave shaft and the secondary sheave shaft;
  at least a portion of the electric motor is located above and in front of the primary sheave shaft in a longitudinal direction of the vehicle as viewed in a sheave shaft direction; and
  the primary sheave and the electric motor overlap with each other as viewed in the sheave shaft direction.

2. The straddle-type vehicle according to claim 1, further comprising a front fender disposed in front of the V-belt continuously variable transmission.

3. The straddle-type vehicle according to claim 1, further comprising an exhaust pipe of the engine disposed above the V-belt continuously variable transmission, and the electric motor is located in front of the V-belt continuously variable transmission.

4. The straddle-type vehicle according to claim 1, wherein a rotary shaft of the electric motor is coincident in direction with the primary sheave shaft.

5. A straddle-type vehicle comprising:
   a V-belt continuously variable transmission arranged to transmit a driving force of an engine to a driving wheel, the V-belt continuously variable transmission including:
       a primary sheave disposed on a primary sheave shaft, to which the driving force of the engine is input, and including a movable sheave half and a fixed sheave half arranged to define a V-groove adapted to receive a belt;
       a secondary sheave disposed on a secondary sheave shaft, from which a driving force for the driving wheel is output, and including a movable sheave half and a fixed sheave half arranged to define a V-groove adapted to receive a belt;
       a V-belt received in the respective V-grooves of the primary sheave and the secondary sheave to transmit a rotational driving force between the primary and secondary sheaves;
       an electric motor;
       a control device arranged to control the electric motor; and
       a sheave drive mechanism arranged to transmit a driving force of the electric motor to the movable sheave half of the primary sheave to control respective groove widths of the primary sheave and the secondary sheave; wherein
   the movable sheave half of the primary sheave is located on an outer side in a vehicle width direction with respect to the fixed sheave half of the primary sheave;
   the sheave drive mechanism is located on an outer side in the vehicle width direction with respect to the movable sheave half of the primary sheave;
   a footrest of the straddle-type vehicle is located on an outer side of the V-belt continuously variable transmission in the vehicle width direction and below the primary sheave shaft and the secondary sheave shaft;
   at least a portion of the electric motor is located above and in front of the primary sheave shaft in a longitudinal direction of the vehicle as viewed in a sheave shaft direction; and
   the electric motor is located closer to the primary sheave shaft than a speed reduction mechanism of the sheave drive mechanism is, as viewed in the sheave shaft direction.

6. The straddle-type vehicle according to claim 1, wherein the sheave drive mechanism is located around the primary sheave shaft and the electric motor is located on an outer side of the sheave drive mechanism.

7. A power unit comprising:
   an engine including a crankcase and a cylinder block attached to the crankcase; and
   a V-belt continuously variable transmission disposed on a side of the crankcase of the engine and arranged to transmit a driving force of the engine to a driving wheel, the V-belt continuously variable transmission including:
       a primary sheave disposed on a primary sheave shaft, to which the driving force of the engine is input, and including a movable sheave half and a fixed sheave half arranged to define a V-groove adapted to receive a belt;
       a secondary sheave disposed adjacent to the primary sheave and on a secondary sheave shaft, from which a driving force for the driving wheel is output, and including a movable sheave half and a fixed sheave half arranged to define a V-groove adapted to receive a belt;
       a V-belt received in the respective V-grooves of the primary sheave and the secondary sheave to transmit a rotational driving force between the primary and secondary sheaves;
       an electric motor;
       a control device arranged to control the electric motor; and
       a sheave drive mechanism arranged to transmit a driving force of the electric motor to the movable sheave half of the primary sheave to control respective groove widths of the primary sheave and the secondary sheave; wherein
   the movable sheave half of the primary sheave and the sheave drive mechanism are located on an opposite side from the crankcase with respect to the fixed sheave half of the primary sheave;
   the electric motor is located on the same side of the cylinder block with respect to a virtual plane including the primary sheave shaft that is substantially perpendicular to a cylinder axis of the cylinder block; and
   the primary sheave and the electric motor overlap with each other as viewed in the sheave shaft direction.

8. The power unit according to claim 7, wherein a rotary shaft of the electric motor is coincident in direction with the primary sheave shaft.

9. A power unit comprising:
   an engine including a crankcase and a cylinder block attached to the crankcase; and
   a V-belt continuously variable transmission disposed on a side of the crankcase of the engine and arranged to transmit a driving force of the engine to a driving wheel, the V-belt continuously variable transmission including:
       a primary sheave disposed on a primary sheave shaft, to which the driving force of the engine is input, and including a movable sheave half and a fixed sheave half arranged to define a V-groove adapted to receive a belt;
       a secondary sheave disposed adjacent to the primary sheave and on a secondary sheave shaft, from which a driving force for the driving wheel is output, and including a movable sheave half and a fixed sheave half arranged to define a V-groove adapted to receive a belt;
       a V-belt received in the respective V-grooves of the primary sheave and the secondary sheave to transmit a rotational driving force between the primary and secondary sheaves;
       an electric motor;
       a control device arranged to control the electric motor; and
       a sheave drive mechanism arranged to transmit a driving force of the electric motor to the movable sheave half of the primary sheave to control respective groove widths of the primary sheave and the secondary sheave; wherein the movable sheave half of the primary sheave and the sheave drive mechanism are located on an opposite side from the crankcase with respect to the fixed sheave half of the primary sheave;

the electric motor is located on the same side of the cylinder block with respect to a virtual plane including the primary sheave shaft that is substantially perpendicular to a cylinder axis of the cylinder block; and the electric motor is located closer to the primary sheave shaft than a speed reduction mechanism of the sheave drive mechanism is, as viewed in the sheave shaft direction.

10. The power unit according to claim 7, wherein the sheave drive mechanism is located around the primary sheave shaft and the electric motor is located on an outer side of the sheave drive mechanism.

11. The straddle-type vehicle according to claim 5, further comprising an exhaust pipe of the engine disposed above the V-belt continuously variable transmission, and the electric motor is located in front of the V-belt continuously variable transmission.

12. The straddle-type vehicle according to claim 5, further comprising a front fender disposed in front of the V-belt continuously variable transmission.

13. The straddle-type vehicle according to claim 9, wherein the sheave drive mechanism is located around the primary sheave shaft and the electric motor is located on an outer side of the sheave drive mechanism.

14. The power unit according to claim 7, wherein the sheave drive mechanism is located around the primary sheave shaft and the electric motor is located on an outer side of the sheave drive mechanism.

* * * * *